United States Patent [19]
Dent

[11] Patent Number: 5,859,664
[45] Date of Patent: Jan. 12, 1999

[54] METHOD AND APPARATUS FOR LINE OR FRAME-SYNCHRONOUS FREQUENCY HOPPING OF VIDEO TRANSMISSIONS

[75] Inventor: Paul Wilkinson Dent, Pittsboro, N.C.

[73] Assignee: Ericsson Inc., Research Triangle Park, N.C.

[21] Appl. No.: 791,862

[22] Filed: Jan. 31, 1997

[51] Int. Cl.⁶ ..................................................... H04N 5/38
[52] U.S. Cl. ............................ 348/21; 348/470; 375/202
[58] Field of Search ............................. 348/21, 470, 495; 325/200, 202; 455/296, 302, 313, 314

[56] References Cited

U.S. PATENT DOCUMENTS

| | | | |
|---|---|---|---|
| 4,532,636 | 7/1985 | Wilkinson . | |
| 4,821,120 | 4/1989 | Tomlinson | 375/1 |
| 4,890,283 | 12/1989 | Tsinberg et al. | 370/84 |
| 5,048,059 | 9/1991 | Dent . | |
| 5,285,470 | 2/1994 | Schreiber | 375/1 |
| 5,659,353 | 8/1997 | Kostreski et al. | 348/21 |
| 5,712,866 | 1/1998 | Stein et al. | 375/200 |
| 5,729,825 | 3/1998 | Kostreski et al. | 455/3.1 |
| 5,737,026 | 4/1998 | Lu et al. | 348/473 |

FOREIGN PATENT DOCUMENTS

| | | |
|---|---|---|
| 0 068 690 A1 | 6/1982 | WIPO . |
| 0 069 477 A1 | 6/1982 | WIPO . |

*Primary Examiner*—Victor R. Kostak
*Attorney, Agent, or Firm*—Jenkens & Gilchrist, P.C.

[57] ABSTRACT

A method and apparatus for transmitting and receiving frequency hopped video signals is disclosed. A composite video signal is processed at a transmission end to remove line and frame synchronization codes and replace them with a frequency hopping synchronization code. The signal is then modulated with a frequency hopped carrier signal and transmitted to a receiver. The receiver detects the frequency hopping synchronization code to enable tuning of the receiver to the video signal. The detected frequency hopping synchronization codes are removed and replaced with the original line and frame synchronization code. The recreated video signal may be digitized and processed to detect and correct errors within the video signal by replacing lines or frames of the video signal with closely related lines or frames from another portion of the video signal.

35 Claims, 6 Drawing Sheets

METHOD AND APPARATUS FOR LINE OR FRAME-SYNCHRONOUS FREQUENCY HOPPING OF VIDEO TRANSMISSIONS

BACKGROUND OF THE INVENTION

1. Technical Field of the Invention

The present invention relates to the transmission of video signals, and more particularly, to the transmission of video signals using line or frame synchronous frequency hopping.

2. Description of Related Art

The transmission of video signals involves the transmission of a video luminance signal between a transmitting and receiving unit. Creation of the video luminance signal is accomplished by vertical and horizontal raster scanning of the video images on a video image tube. The raster scanning includes horizontal line flyback times during which the video signal is blanked to the black condition by a line synchronization pulse while the scan returns back to the initial position for the next horizontal line. Vertical scan synchronization pulses are transmitted during a vertical frame flyback time wherein the scan returns from a lower right-hand to an upper or left-hand corner of a video frame.

Figure 1:
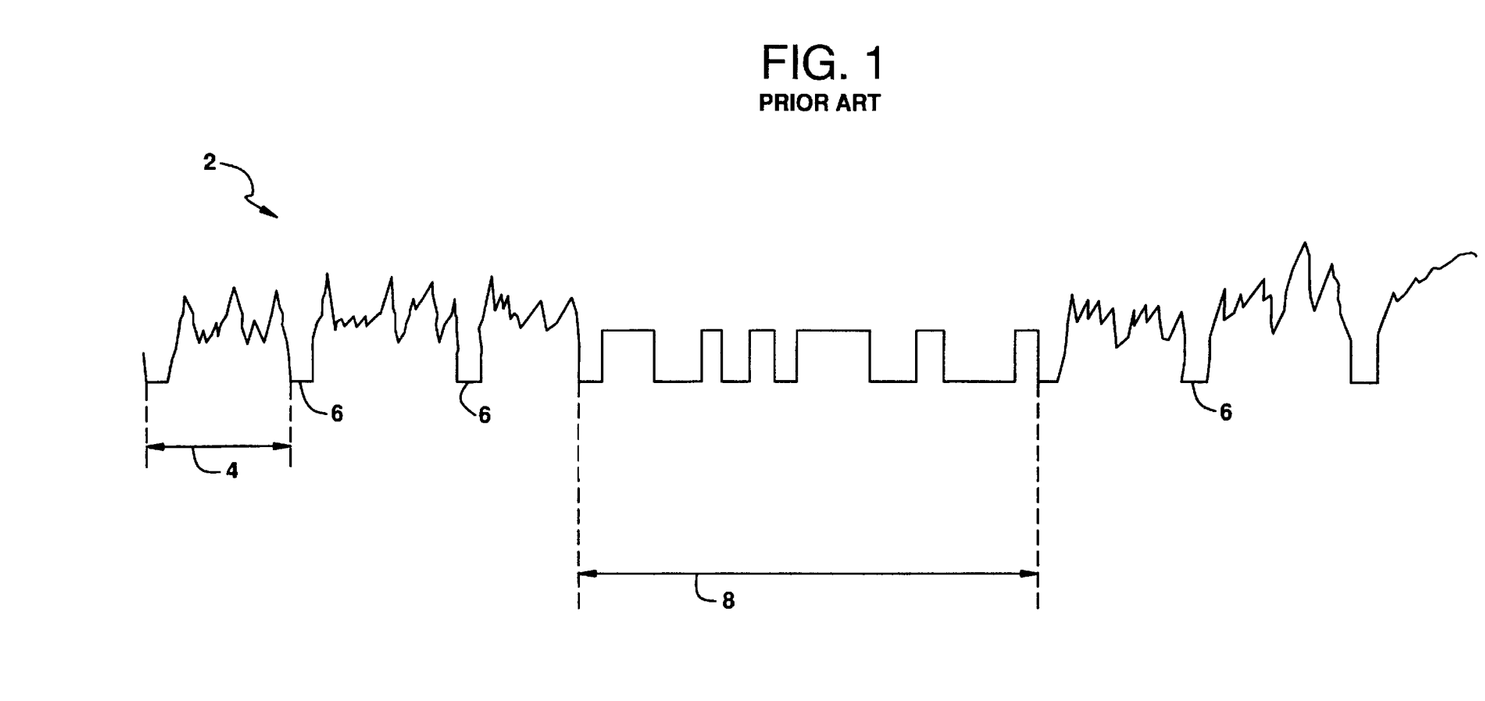
FIG. 1 is an illustration of a prior art video signal.

FIG. 1 illustrates a prior art video wave form used for video transmission. A video signal 2 represents variations in image intensity over a period in time. The video signal 2 is separated into a plurality of line scan periods 4 which are separated by regular occurrences of line sync pulses 6. The video signal 2 is blanked to the black level during the line scan flyback time to prevent unwanted lines as the scan spot returns from right to left on the screen. For color video images, a chrominance signal (not shown) is added to the video signal. However, this does not materially alter the appearance of the video waveform depicted in FIG. 1.

After each 625 line period, a frame sync pulse 8 is inserted to indicate the separation between two video frames. The frame sync pulse 8 allows the frame scan to return to the top of the next video frame during the frame flyback time. The frame sync pulse synchronizes the vertical scan generator at the video signal receiver. The video signal is blanked to the black level during the frame flyback period to prevent generation of diagonal lines on the screen as the spot returns from the bottom right to the top left of the video frame.

When interlacing is used, every other horizontal line of the video frame is presented over two vertical scan periods. The vertical scan returns from the bottom right to the top left after approximately half the line periods and starts a new vertical scan to fill-in the alternate lines that were not included in the first half scan. Interlacing allows half of the horizontal lines to be updated twice as frequently, reducing image flicker and providing improved response to movement of the image. A complete image of 625 lines is thus transmitted every two vertical scan periods.

Conventional video broadcasts have used vestigial sideband amplitude modulation. This is a form of double-side band amplitude modulation in which the higher video frequency components of one sideband are suppressed by a filter to reduce transmission bandwidth requirements. The vestigial sideband transmissions are sensitive to interference. Thus, transmitters that are allocated the same channel frequency must be widely geographically spaced to prevent any interference.

Frequency modulation may alternatively be used to transmit the composite video signal in a manner that is much less sensitive to interference. However, frequency modulation requires a much wider bandwidth. FM video transmission is utilized in broadcast satellite/electronic news gathering services (BAS/ENG). The system utilizes an ad hoc channel allocation scheme whereby an ENG service wishing to temporarily setup within a given area applies for a frequency to a frequency allocating service.

The frequency allocating service allocates a frequency with regard to other users that may be close enough to create interference between signals. Individuals already utilizing the same frequency must be far enough away to cause no perceptible video picture degradation. The frequency allocating service must allocate frequencies on a conservative geographical spacing to guarantee non-interference. Conservative geographical spacing however reduces the efficiency of spectral use creating a poor utilization of resources. Therefore, a system enabling better utilization of video frequency transmission resources would be greatly beneficial.

SUMMARY OF THE INVENTION

The present invention overcomes the foregoing and other problems with a new method and apparatus for transmitting a video signal using frequency hopping techniques. The transmission portion of the system includes a modulator for modulating the video signal onto a radio frequency carrier selected from a plurality of radio frequency carriers. The carrier is varied according to a prearranged frequency hopping pattern.

Frequency hopping synchronization codes are inserted within the modulated video signal by stripping existing line and frame synchronization codes from the video frame and inserting in their place a frequency hopping synchronization code and a frequency changing period. Frequency hopping synchronization codes indicate which frequency carrier is carrying a particular line or frame of the video signal. The frequency changing period provides a period of dead time during which a carrier frequency may be changed from one frequency to another within the preselected frequency hopping pattern.

A radio receiver is tuned to receive the frequency hopped video signal on a selected radio frequency carrier according to the prearranged pattern. At the radio receiver, the frequency hopping synchronization codes are detected and used to control the tuning of the radio receiver. The detected frequency hopping synchronization codes are removed from the video signal and the line and frame synchronization codes are reinserted. The received video signal may also be digitized and processed by a combination memory and digital signal processor configuration which detects transmission errors within the video signal according to preselected criteria. Portions of the video signal not meeting these criteria may be corrected by replacing the erroneous portion with another line or frame from the transmitted video signal.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 2:
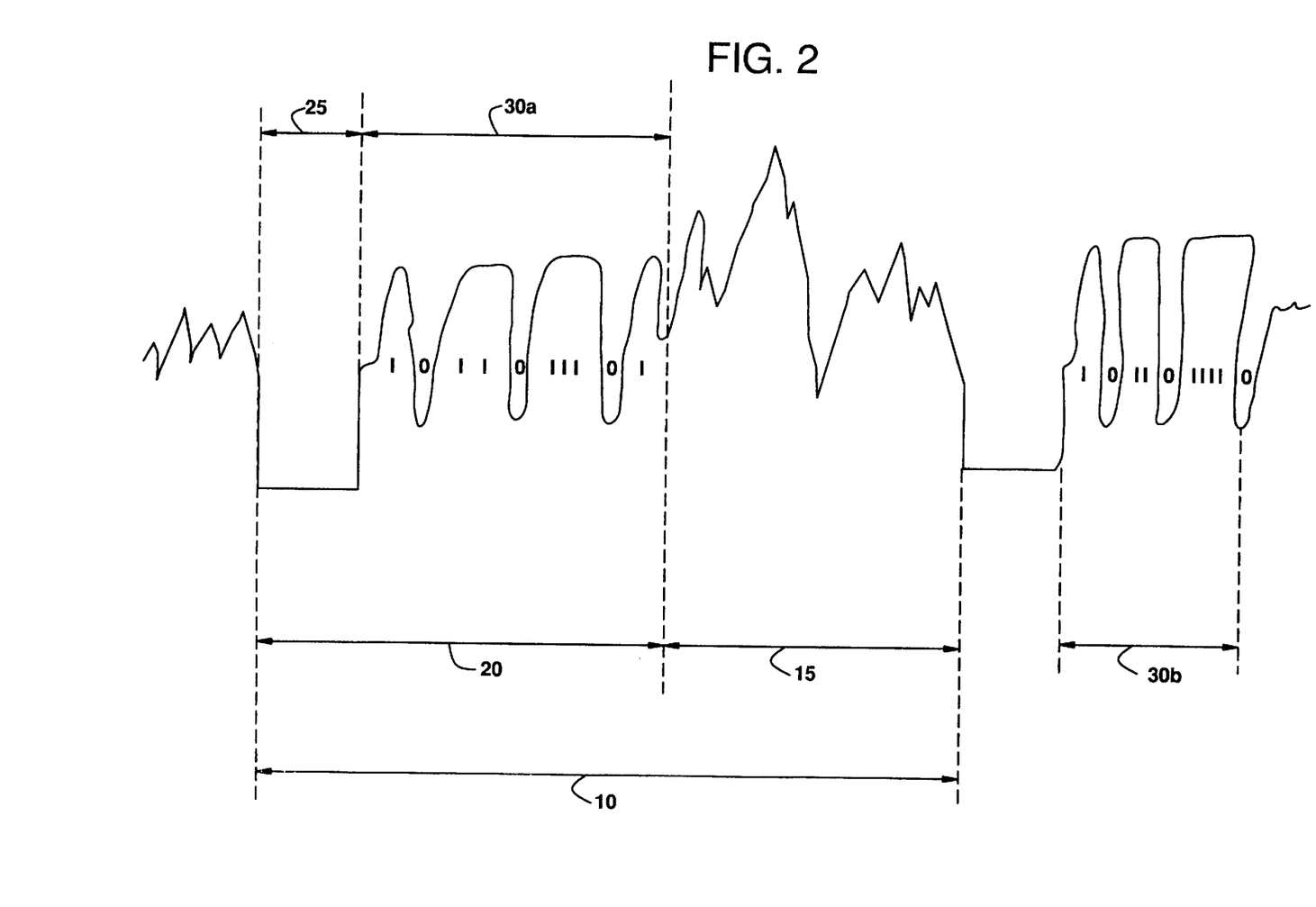
FIG. 2 is a illustration of a frequency hopped video signal including a frequency changing time and a line sync code.

Referring now to the Drawings, and more particularly, to FIG. 2, wherein there is illustrated the frequency hopped video signal of the present invention. The video signal includes two line scan periods 10 wherein each line scan period includes all of the necessary information for recreating a single line of a video frame. The line scan period 10 includes the luminance/chrominance signal 15 and the horizontal scan flyback period 20. The video luminance/chrominance signal 15 represents the variation in image intensity over a line period of a video frame. The horizontal scan flyback period 20 provides the time necessary for the raster scan to return from the left-hand to the right-hand side of the video frame.

The length of a line scan period 10 of the present invention is the same as that of a presently existing line scan period, as is the length of the horizontal scan flyback period 20. However, the horizontal scan flyback period 20 is divided into a frequency changing period 25 and a line sync code 30. The frequency changing period 25 provides a timeslot during which a frequency hopped carrier signal may be switched between frequencies. The line sync code comprises a binary code identifying the line number of the video frame with which the line scan period 10 is associated. For example, line sync code 30a is a 10 bit code (1011011101) which translates into line number 733, while line sync code 30b identifies the next line number 734. Code patterns such as 0000000000 and 1111111111 are avoided due to their difficulty of detection. By identifying each line number of a video frame with a separate line sync code, no specific frame sync signal is required. This is due to the fact that the start of the frame is always indicated by the first line number of the frame thus eliminating the need for frame sync coding signals.

Figure 3:
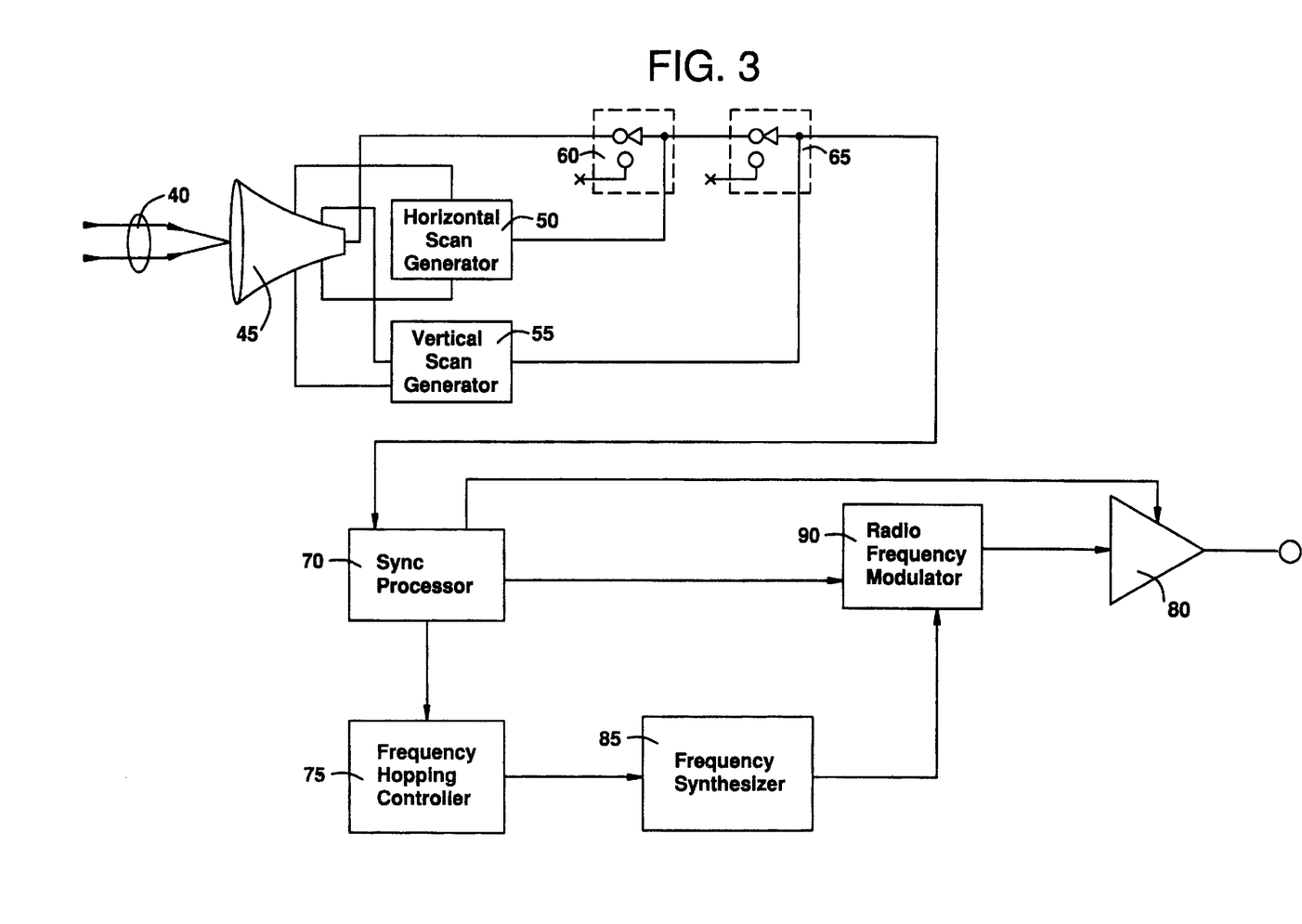
FIG. 3 is a block diagram illustrating a frequency hopping video signal transmitter.

Referring now to FIG. 3, there is illustrated a frequency hopped video signal transmitter. A lens 40 focuses an image on the light sensitive electrodes of a video tube 45. A light dependent electric charge is generated on the surface of the light sensitive electrode reproducing the pattern of the image in a corresponding pattern of electric charge. A horizontal scan generator 50 and a vertical scan generator 55 deflect an electron beam within the video tube 45 to scan the light sensitive electrode and detect the electric charge sequentially at different points along horizontal scan lines until the entire charge image is scanned. This comprises a single video frame. The process then repeats for the next frame. The sequential electric charge variations detected by the electronic beam are output as a luminance signal (in the case of a monochrome video) or as a luminance signal representing one of three primary color components of the image (in the case of a color video).

A color camera may comprise three video tubes 45. Each video tube 45 corresponds to a different primary color component. The three color component signals are converted prior to transmission into a luminance signal and a chrominance signal by an RGB to composite-video converter (not shown).

A line sync switch 60 is synchronized by a control signal from the horizontal scan generator 50 to insert within the video signal a blanking signal or line sync pulse during the horizontal scan flyback period 20 (FIG. 1). Similarly, a frame sync switch 65 is synchronized by the vertical scan generator 55 to insert a frame sync signal within the video signal during a vertical scan flyback period. It should be appreciated that in alternative embodiments the video tube 45 may alternatively be replaced by a solid state device.

The video signal from the camera 35 is fed to a sync processor 70 to synchronize frequency hopping of the video signal from the television camera 35 for transmission. The sync processor 70 detects the line and frame sync signals within the conventional composite video signal and replaces the conventional sync signals with the frequency changing period 25 and line sync codes 30 described previously with respect to FIG. 2. The sync processor 70 keeps track of the proper line sync code 30 to be inserted for each line of a frame as it is processed.

The sync processor 70 also generates a power-up/down ramping signal 71 to a transmission power amplifier 80 to control transmissions during the time period the channel frequency is being changed. The ramping signal 71 discontinues signal transmission while channel frequencies are changed and resumes signal transmission upon completion of a channel frequency change during a frequency hopping sequence.

The random frequency hopping channel sequence is generated by a frequency hopping controller 75 in response to line and frame sync codes transmitted from the sync processor 70. The frequency hopping controller 75 controls the manner in which a frequency synthesizer 85 generates the frequency hopped carrier signal to be modulated with the video signal. The frequency hopping controller 75 can be programmed to generate the frequency hopped carrier signal in a variety of ways.

In a first mode, each line of a video frame may have an associated frequency wherein the frequency sequence is constant from frame-to-frame. Alternatively, the sequence of frequencies used for each line may vary from frame-to-frame in response to a frame counter. This mode is referred to as fast frequency hopping transmission of video since the carrier frequency is changed for each line of a video frame.

In a second mode of frequency hopping, called slow frequency hopping transmission of video, the carrier frequency is only changed between each video frame of a video signal. Thus, an entire frame would be transmitted using the same carrier frequency. The carrier frequency would only be changed between frames and not for each line of the frame.

The generated carrier frequency signal from frequency synthesizer 85 is modulated with the video signal at modulator 90. The modulated signal is then amplified for transmission to a video receiver by power amplifier 80.

Figure 4:
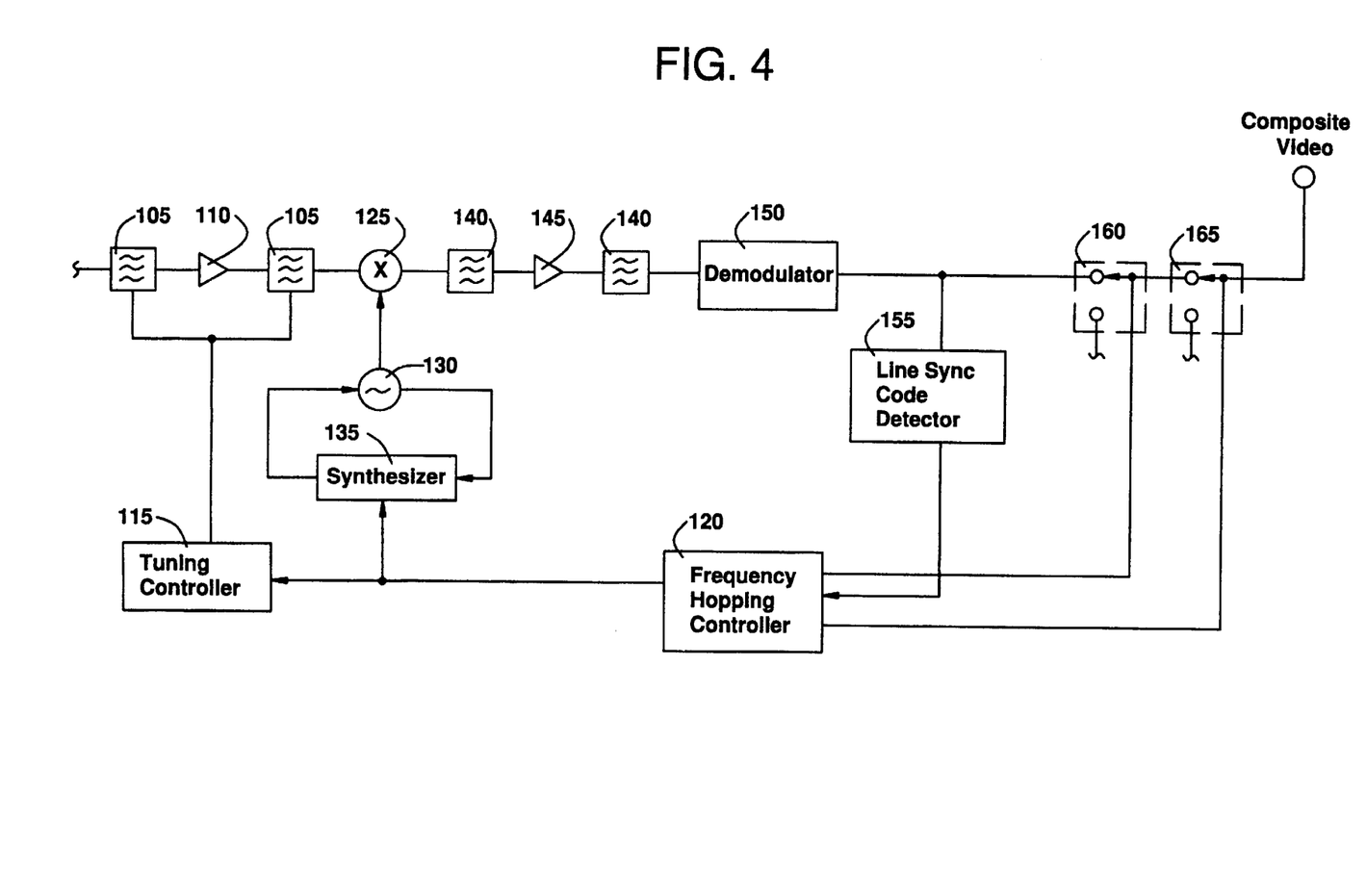
FIG. 4 is a block diagram of a frequency hopping video receiver without interference mitigation.

Referring now to FIG. 4, there is illustrated a video receiver for receiving a frequency hopped video signal. The video signal transmission is received via an antenna 100. The signal is next filtered and amplified using tuned filters 105 and RF amplifier 110. The tuned filters 105 are dynamically tuned between carrier frequencies by tuning controller 115 in response to signals from the frequency hopping controller 120.

A mixer 125 converts the amplified video signal into a suitable intermediate frequency signal by heterodyne conversion with a local oscillator signal from local oscillator 130. The local oscillator 130 is controlled by frequency synthesizer 135 which is able to rapidly change frequency in response to control signals from the frequency hopping controller 120.

The mixer 125 provides the desired operating channel IF signal. This IF signal is further filtered and amplified using IF filters 140 and IF amplifier 145 to obtain a sufficiently high signal level for demodulation. The demodulator 150 demodulates the IF signal to reproduce the composite video signal.

The demodulated video signal from demodulator 150 is applied to line sync code detector 155 to determine the line sync code pattern inserted by the sync processor 70 (FIG. 2) at the transmitter. The output of the line sync code detector 155 is a 10 bit code indicating which code was determined to be most strongly detected. The detection timing, in one example, is related to the peak correlation with an anticipated code supplied from the frequency hopping controller 120. Alternatively, the detection timing may be derived from I/O level crossings in the received sync code signal.

Frequency hopping controller 120 utilizes a flywheel sync technique similar to a phase lock loop for detecting code timing by comparisons with a predicted timing based on the average past history, and a "speed-up" or "slowdown" signal generated to synchronize the frequency hopping controller to the received signal on an average basis. The frequency hopping controller 120 then supplies control outputs to a line sync switch 160 to blank out the line sync code on the output signal of the demodulator 150 and reinsert a conventional video line sync signal. Likewise, a control output is supplied to frame sync switch 165 to blank out a line sync code and reinsert the conventional frame sync signal.

The frequency hopping techniques utilized by the video signal transmitting and receiving systems may utilize either random frequency hopping or orthogonal frequency hopping. Orthogonal frequency hopping guarantees a number of nearby users will not select the same frequency channel at the same time and interfere with each other. Users that are orthogonal to one another must be synchronized in time using, for example, a GPS satellite signal as a timing reference. Users further away from the source of interference can employ frequency hopping that is orthogonal to their most proximate potential interferers. This forms a second mutually orthogonal group that is non-orthogonal to the first orthogonal group. When the total number of users is greater than the number of channels available, some frequency reuse is inevitable which leads to interference. Using the invention as described however, the interference is not always between the same pair of co-channel systems, but varies randomly due to the frequency hopping. This give the benefit known as "interferer averaging" and avoids the need to plan for worst case scenarios.

Figure 5:
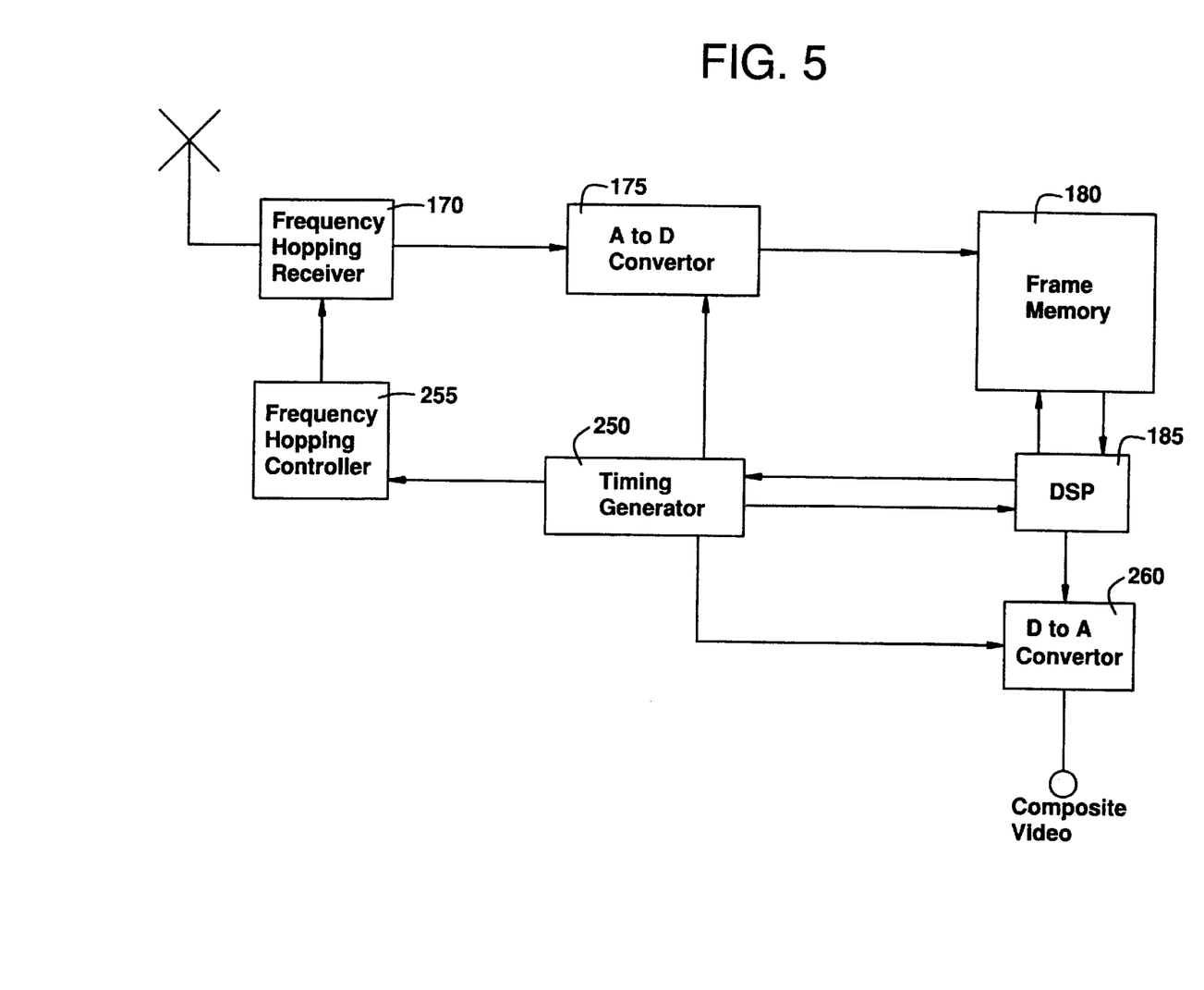
FIG. 5 is a block diagram of a frequency hopping receiver including interference mitigation processing.

FIG. 5 illustrates an alternative embodiment of the receiver including means for implementing interference mitigation. A frequency hopping receiver 170 constructed broadly in accordance with receiver illustrated in FIG. 4 outputs a demodulated signal to analog-to-digital converter 175. Analog-to-digital converter 175 samples the demodulated signal at a frequency at least in accordance with the maximum horizontal pixel resolution of the video frame such that at least one sample per pixel is taken. The sampling rate should also be sufficient to provide an integral number of samples per symbol or bit of the line sync code. This enables the line sync code symbols to be represented by an integral number of pixels of either a one level or zero level depending on the line number.

The A/D converter outputs samples at a continuous rate to a buffer memory 180. The buffer memory 180 stores a plurality of video lines or frames of the video signal. A digital signal processor 185 is connected to the buffer memory 180 to enable access to the memory independent of the A/D converter 175. This enables A/D converter 175 to continuously write samples into the buffer memory 180 without noticeably interrupting the operations of the digital signal processor 185.

Figure 6:
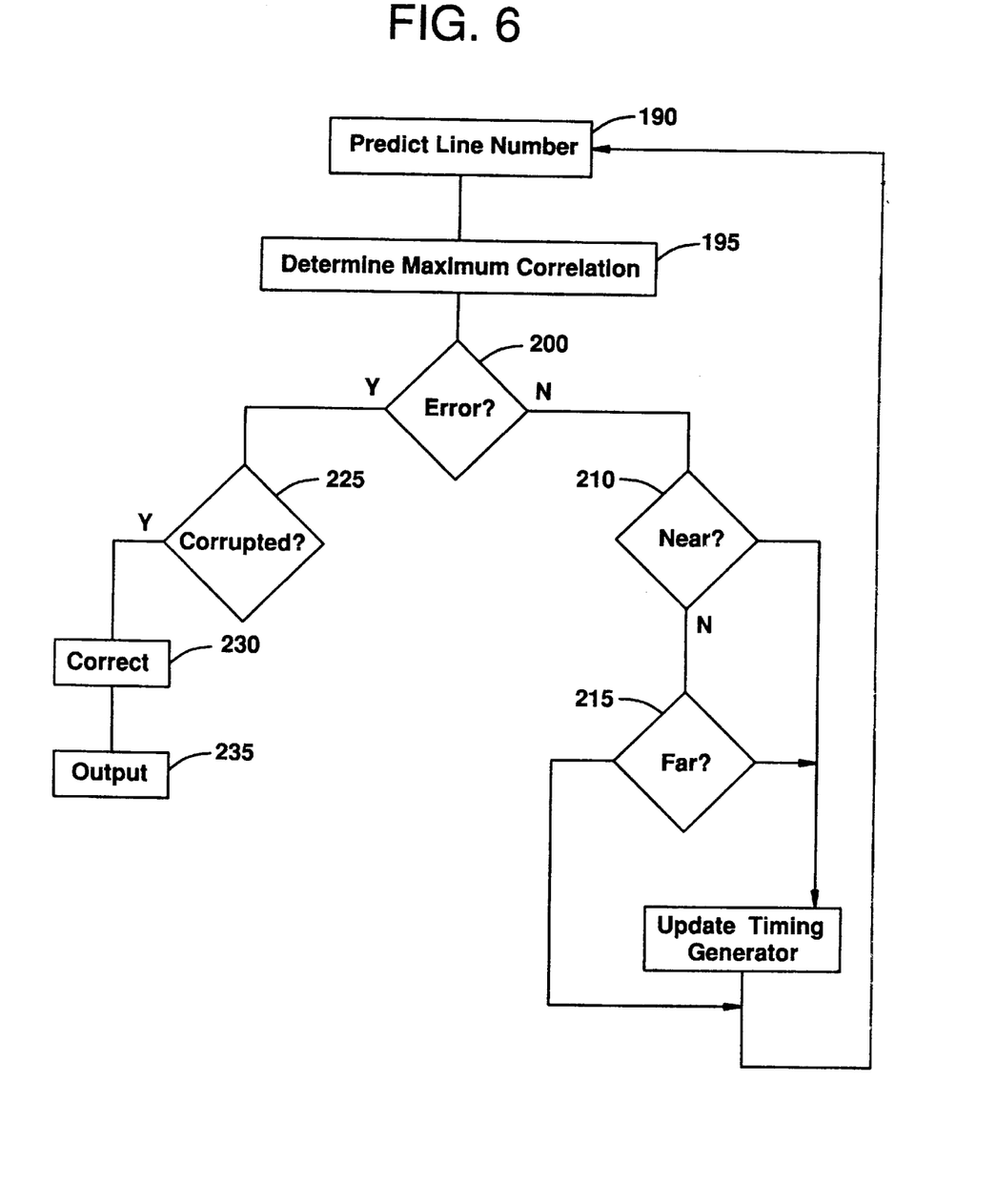
FIG. 6 is a flow chart illustrating the functionalities performed by the processor of the frequency hopping receiver.

The digital signal processor 185 comprises a highspeed computer capable of performing a variety of functionalities for detecting and correcting interference within the received video signal. Referring now to FIG. 6 there is illustrated a flow chart generally describing the functionalities performed by the DSP 185. Initially, a prediction is made at step 190 as to where in memory the next line of samples to be processed will begin and what the expected line number of the line will be. Next, a search is conducted at step 195 around the predicted location for occurrence of the predicted line number to determine a maximum point of correlation. Inquiry step 200 determines if the expected line code number was correctly detected near the predicted location or if there was an error.

If no error occurred, inquiry step 210 determines whether the beginning of the next line position is too near to the first sample in a line, and inquiry step 215 determines if the beginning of the next line position is too far from the first sample in the line. If either of these conditions occur, control passes to step 220 wherein the timing generator is instructed to adjust frequency changes and adjust the sample timing for the A/D converter. Control then passes back to 190.

If error is detected at step 200, control passes to inquiry step 225 to determine if the line of video data has been corrupted by interference. The algorithm for detecting whether a line of video data is corrupted may simply involve determining whether the detected line sync code was equal to the predicted line sync code. Alternatively, more complex algorithms can be used to determine whether a block of consecutive lines in the frame have a high sync code error rate.

The data may also be flagged as corrupted if the signal strength indicated by the receiver was unexpectedly high during one or more lines indicating that a different, unwanted signal was temporarily received. In the case of slow frequency hopping, whole frames may be deemed good or bad by counting how many line number codes were correctly received out of the total number of 625 line codes. A threshold can be placed indicating the number of errors permitted before a frame is considered corrupted.

Corrupted information is corrected at step 230 and the corrected data is output at step 235. Correction of corrupted data may be accomplished in a variety of manners. When a frame or line is corrupted, the corrupted frame or line is merely replaced with a previous or subsequent frame or line.

More complex interference mitigation correction algorithms may include the use of narrow band frequency excision filters in which samples collected from memory 180 are frequency analyzed over one or more scan lines using a fast fourier transform to determine the presence of a dominant frequency component that is not present on adjacent lines or frames. The dominant frequency component is set to zero before inverse fourier transforming to obtain a corrected signal with the narrow band interference removed. Such techniques are best performed by collecting undemodulated signals from the receiver in the form of complex number samples which after correction for interference are subjected to numerical demodulation algorithms in the DSP 185. An alternative method of digitizing radio signals while preserving their complex vector nature is described in U.S. Pat. No. 5,048,059, issued to the Applicant, which is herein incorporated by reference.

Another interference mitigation algorithm for correcting line corrupted data involves synthetically regenerating a corrupted line of video pixels by interpolating the pixel data between adjacent lines of the same frame, between the same lines in successive frames or using the eight lines surrounding a corrupted line number from the current frame, the previous frame and the subsequent frame. The interpolation algorithm is not restricted to a linear algorithm. For example, the line of the frame previous to the corrupted line can be correlated with the same line number in the previous frame and the next frame to determine the degree of correlation with each. The correlation coefficients can be used to form a weighted sum of the line from the previous and next frames having the same line number as the corrupted frame, which, in the limit, can mean selecting either the same line of the previous frame or the same line of the next frame to replace the corrupted line.

The interference mitigation algorithm can also be adapted to the nature of the interference expected. For example, when the channel frequency selected for a whole frame is a frequency likely to be utilized by another frequency hopping system, steps are taken to synchronize the frame periods of all systems using a GPS satellite. The interference would then be expected to be frame synchronous and a bad frame replacement algorithm would make a good/bad decision on a whole frame basis and replace the frame if deemed bad.

On the other hand, if the frequency selected for a frame was in a band shared with mobile satellite services that have different interference characteristics, such as interfering with certain number of consecutive lines rather than a whole frame, then the interference detection and mitigation algorithm could be momentarily adapted for that case.

If it is determined at step 210 that the new line starting position is too near the first sample or is too far into the line, update timing generator 250 may be advanced or retarded in order to cause frequency changes to occur earlier or later for demodulation and decoding purposes. This will also alter the sample timing for the A/D converter 175. The update timing generator 250 and frequency hopping controller 255 control the frequency hopping receiver 170 and A/D converters 175, 260 to enable proper demodulation and decoding of the frequency hopped video signal to regenerate the composite video signal.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for transmitting a video signal having improved immunity to signal interference comprising the steps of:
   replacing line synchronization pulses with a frequency hopping synchronization signal;
   modulating the video signal onto a radio frequency carrier selected from a plurality of radio frequency carriers;
   varying the selected radio frequency carrier according to a prearranged pattern; and
   turning a radio receiver to receive the video signal on the selected radio frequency carrier according to the prearranged pattern.

2. The method of claim 1 wherein the step of varying further comprises varying the selected radio frequency carrier between successive frame portions of the video signal such that successive frames are modulated using a different one of the plurality of radio frequency carriers according to the prearranged pattern.

3. The method of claim 1 wherein the step of varying further comprises varying the selected radio frequency carrier between successive video line portions of the video signal such that successive lines are modulating using a different one of the plurality of radio frequencies according to the prearranged pattern.

4. The method of claim 1 further comprising the step of replacing frame synchronization pulses with a frequency hopping synchronization signal and a frequency changing guard period.

5. The method of claim 1 wherein the step of tuning further comprises the steps of:
   detecting a frequency hopping synchronization signal within the video signal; and
   tuning the radio receiver according to the detected frequency hopping synchronization signal.

6. The method of claim 5 further including the step of replacing the detected frequency hopping synchronization signal with a line synchronization signal within the video signal.

7. The method of claim 5 further including the step of replacing the detected frequency hopping synchronization signal with a frame synchronization signal within the video signal.

8. The method of claim 1 further including the steps of:
   determining if each frame of the received video signal satisfies predetermined quality criteria;
   replacing frames not satisfying the predetermined quality criteria with a second frame satisfying the predetermine quality criteria.

9. The method of claim 1 further including the steps of:
   determining if each line of the received video signal satisfies predetermined quality criteria;
   replacing lines not satisfying the predetermined quality criteria with a second line satisfying the predetermine quality criteria.

10. A method for transmitting a frequency hopped video signal, comprising the steps of:
    detecting synchronization pluses within a video signal;
    replacing the detected synchronization pulses with a frequency hopping synchronization signal;
    modulating the video signal onto a selected radio frequency carrier selected from a plurality of radio frequency carriers; and
    varying the selected radio frequency carrier among the plurality of radio frequency carriers according to a prearranged pattern in response to the frequency hopping synchronization signal.

11. The method of claim 10 wherein the step of varying further comprises varying the selected radio frequency between successive frames of the video signal such that successive frames are modulated using a different one of the plurality of radio frequency carriers according to the prearranged pattern.

12. The method of claim 10 wherein the step of varying further comprises varying the selected radio frequency between successive video lines of the video signal such that successive lines are modulating using a different one of the plurality of radio frequencies according to the prearranged pattern.

13. The method of claim 10 wherein the detected synchronization pulses comprise line synchronization pluses.

14. The method of claim 10 wherein the detected synchronization pulses comprise frame synchronization pulses.

15. The method of claim 10 further including the step halting transmission of the frequency hopped video signal while replacing the synchronization pulses.

16. A method of receiving a frequency hopped video transmission, comprising the steps of:
   detecting a frequency hopping synchronization signal within the frequency hopped video signal;
   tuning a receiver to receive the video signal on a radio frequency carrier selected from a plurality of radio frequency carriers according to a prearranged pattern in response to the frequency hopping synchronization signal;
   replacing the detected frequency hopping synchronization signal with a synchronization signal within the video signal; and
   changing the radio frequency carrier according to the prearranged pattern between synchronization signals.

17. The method of claim 16 wherein the detected synchronization signal is replaced by line synchronization pulses.

18. The method of claim 16 wherein the detected synchronization signal is replaced by frame synchronization pulses.

19. The method of claim 16 further including the steps of:
   determining if each frame of the received video signal satisfies predetermined quality criteria;
   replacing frames not satisfying the predetermined quality criteria with a second frame satisfying the predetermine quality criteria.

20. The method of claim 19 further including the steps of:
   determining if each line of the received video signal satisfies predetermined quality criteria;
   replacing lines not satisfying the predetermined quality criteria with a second line satisfying the predetermine quality criteria.

21. An apparatus for transmitting a frequency hopped video signal, comprising:
   means for processing a composite video signal to detect synchronization pluses within the composite video signal and replacing the detected synchronization pulses with a frequency hopping synchronization code;
   means for generating a plurality of carrier frequencies according to a prearranged pattern in response to the frequency hopping synchronization code generated by the means for processing; and
   a modulator for modulating the video signal including the frequency hopping synchronization code.

22. The apparatus of claim 21 further including a power amplifier responsive to a control signal from the means for processing for selectively halting transmission of the video signal while the carrier frequency is changed.

23. The apparatus of claim 21 wherein the means for generating further comprises:
   a frequency hopping controller for generating control signals representing the prearranged pattern of carrier frequencies; and
   a frequency synthesizer responsive to the control signals for generating the carrier frequencies.

24. An apparatus for receiving a frequency hopped video signal, comprising:
   a detector for detecting a frequency hopping synchronization code within a received frequency hopped video signal;
   a frequency hopping controller responsive to detection of the frequency hopping synchronization code for generating control signals indicating a frequency hopping sequence of a carrier frequency of the received frequency hopped video signal; and
   means for removing the detected frequency hopping synchronization code and inserting video frame and line synchronization codes.

25. The apparatus of claim 24 further including:
   means for converting a frequency hopped video signal into an intermediate frequency signal, the means for converting responsive to the control signals from the frequency hopping controller; and
   means responsive to the control signals for dynamically tuning receiver filters receiving the frequency hopped video signal.

26. The apparatus of claim 24 further including means for demodulating the frequency hopped video signal.

27. An frequency hopped video signal receiver comprising:
   a frequency hopping receiver for receiving a frequency hopped video signal and generating a demodulated video signal;
   a memory for storing at least one video frame of the demodulated video signal;
   an A/D converter for digitizing the demodulated video signal prior to storage in the memory.
   a processor for determining if errors exist within at least one video frame by comparison to preselected criteria and for correcting any detected errors in an output composite video signal.

28. The receiver of claim 27 further including a A/D converter for generating an analogue output composite video signal of data from the processor.

29. The receiver of claim 27 further including a hopping controller for controlling a frequency hopping decoding sequence applied to the frequency hopping receiver.

30. The receiver of claim 29 further including a timing generator for controlling frequency changes indicated by the frequency hopping decoding sequence.

31. An apparatus for transmitting and receiving a frequency hopped video signals, comprising:
   means for removing frame and line sync codes from a composite video signal and inserting frequency hopping synchronization codes to generate a modified video signal;
   means for modulating the modified video signal using a frequency hopped carrier signal, said means for modulating located at a transmitter; and
   means for removing the frequency hopping synchronization codes and inserting the frame and line synchronization codes to reconstitute a composite video signal, the means for removing located at a receiver.

32. The apparatus of claim 31 further include means for detecting and correcting errors within the composite video at the receiver.

33. The method of claim 29 further including the step of replacing line synchronization pulses with a frequency changing guard period.

34. Method of claim 10 further including the step of replacing detected synchronization pulse with a frequency changing guard period.

35. The apparatus of claim 21 wherein the means for processing further includes replacing the detected synchronization pulse with a frequency changing guard period.

* * * * *